United States Patent
Lenke et al.

(10) Patent No.: US 11,521,470 B2
(45) Date of Patent: Dec. 6, 2022

(54) HAPTIC COMMUNICATION WITH A VEHICLE'S OCCUPANT

(71) Applicant: Cerence Operating Company, Burlington, MA (US)

(72) Inventors: Nils Lenke, Aachen (DE); Rahel Flechtner, Berlin (DE); Karina Sonja Wirth, Berlin (DE)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 17/082,558

(22) Filed: Oct. 28, 2020

(65) Prior Publication Data

US 2022/0130217 A1    Apr. 28, 2022

(51) Int. Cl.
| | |
|---|---|
| *H04B 3/36* | (2006.01) |
| *G08B 6/00* | (2006.01) |
| *B60N 2/00* | (2006.01) |
| *B60W 50/10* | (2012.01) |
| *B60W 50/16* | (2020.01) |
| *B62D 1/02* | (2006.01) |

(52) U.S. Cl.
CPC .............. *G08B 6/00* (2013.01); *B60N 2/002* (2013.01); *B60W 50/10* (2013.01); *B60W 50/16* (2013.01); *B62D 1/02* (2013.01); *B60W 2540/223* (2020.02)

(58) Field of Classification Search
CPC ......... G08B 6/00; B60N 2/002; B60W 50/10; B60W 50/16; B60W 2540/223; B62D 1/02
See application file for complete search history.

(56) References Cited

U.S. PATENT DOCUMENTS

| | | | |
|---|---|---|---|
| 10,457,179 B1 * | 10/2019 | Kentley-Klay | B60N 2/879 |
| 2010/0141407 A1 | 6/2010 | Heubel et al. | |
| 2015/0175172 A1 * | 6/2015 | Truong | G06F 3/04817 701/36 |
| 2015/0216746 A1 | 8/2015 | Dirauf et al. | |
| 2017/0069180 A1 | 3/2017 | Heubel et al. | |
| 2017/0092098 A1 * | 3/2017 | Alampallam | H04B 1/0343 |
| 2017/0256144 A1 * | 9/2017 | Khoshkava | G08B 6/00 |
| 2017/0325518 A1 * | 11/2017 | Poupyrev | D02G 3/12 |
| 2019/0077311 A1 * | 3/2019 | Ali | B32B 9/025 |

FOREIGN PATENT DOCUMENTS

| | | |
|---|---|---|
| DE | 102019000386 A1 | 7/2020 |
| EP | 1730626 A2 | 12/2006 |
| EP | 3180682 A1 | 6/2017 |

OTHER PUBLICATIONS

International Search Report and Written Opinion, PCT/US2020/057657, dated Jun. 28, 2020 (14 pages).

* cited by examiner

*Primary Examiner* — Toan N Pham
(74) *Attorney, Agent, or Firm* — Occhiuti & Rohlicek LLP

(57) ABSTRACT

A haptic-communication system includes a fabric, a frame that supports the fabric, and a haptic element that is integral with a textile that forms the fabric. A transition of the haptic element between first and second states thereof provides communication with a person in contact with the haptic element.

17 Claims, 6 Drawing Sheets

HAPTIC COMMUNICATION WITH A VEHICLE'S OCCUPANT

BACKGROUND

The invention pertains to motor vehicles and, in particular, to communication between a vehicle's occupant and the vehicle itself.

The act of driving a vehicle amounts to establishing two-way communication with the vehicle. The driver operates various controls to communicate commands that the vehicle, if operating correctly, will obey. Similarly, the vehicle communicates information about its state to the driver that, if the driver pays attention, may inform the comments that the driver ultimately issues.

Communication from the vehicle to the driver is typically carried out by a dashboard that displays information that a driver would consider in issuing comments. In addition, the vehicle can also communicate with various noises, ranging from the suitable click of a turn signal to the more urgent buzzing that arises when one's seat belt has come undone.

Communication from the driver to the vehicle is carried out by pressing buttons, for example, to turn on the lights, actuating levers, for example, to switch gears, by pressing down on pedals, and by turning a steering wheel. In some cases, communication from the driver to the vehicle is carried using a speech interface.

SUMMARY

In one aspect, the invention features a haptic-communication system that includes a haptic element, fabric that encloses the haptic element, a frame that supports the fabric, and a sensor that senses mechanical work carried out on the fabric. The haptic element modifies a characteristic of the fabric in response to an output of the work sensor.

In another aspect, the invention features a haptic communication system that includes a frame, fabric supported by the frame, and a haptic element that is integral with the textile that forms the fabric. A transition of the haptic element between states provides communication with a person in contact with the haptic element.

Embodiments include those in which the communication is between the person and the vehicle. Among these are embodiments in which the vehicle provides a message to the person via the haptic element and those in which the person provides a message to the vehicle via the haptic element. Some embodiments are capable of providing communication in either direction.

Embodiments include those in which the sensor is a pressure sensor, those in which it is a piezoelectric sensor, and those in which it is integrated into the fabric.

Embodiments also include those in which the frame comprises a frame of a vehicle's seat and those in which it comprises a frame of a vehicle's steering interface, which in some embodiments is a steering wheel or till and in other embodiments is a portion of a frame of the vehicle's seat.

Also among the embodiments are those in which the sensor is on a frame of a vehicle's seat and performing mechanical work on the fabric causes the sensor to sense the work and to provide a signal that causes the vehicle to be steered in a particular direction that corresponds to the work.

In some embodiments, the sensor outputs a signal that controls a vehicle's user interface.

In other embodiments, the frame is that of a steering interface of a vehicle that is operating in a first driving mode. In such embodiments, the sensor provides a signal that causes the vehicle to cease operating in the first driving mode and to commence operation in a second driving mode.

Embodiments further include those in which the fabric comprises an interactive textile and those in which it comprises a smart textile.

In another aspect, the invention features a vehicle that includes a haptic-communication system as described above as a constituent thereof. Among these are embodiments in which the vehicle is an autonomous vehicle.

Some embodiments include an actuator and a controller. The controller causes the actuator to change a state of the haptic element. Among such embodiments are those in which the controller causes the actuator to change a state of the haptic element in response to a signal from the sensor.

In some embodiments, the actuator comprises a pump that controls a volume of the haptic element.

In another aspect, the invention features an apparatus comprising a haptic-communication system. Such a haptic-communication system includes a frame, fabric, and a haptic element. The frame supports the fabric. The fabric comprises textile that is integral with the haptic element. Transition of the haptic element between first and second states thereof provides communication with a person in contact with the haptic element.

In some embodiments, the contact is physical. It results in stimulation of touch-sensing nerves. This contact need not be direct but can be made through a person's clothing. In other embodiments, the contact amounts to visual contact that stimulates light-sensing nerves.

In some embodiments, the haptic-communication system provides communication between a person in a vehicle and the vehicle. Among these are embodiments in which the haptic-communication system provides communication from a person in a vehicle to the vehicle and embodiments in which it provides communication from a vehicle to a person in the vehicle.

Among the embodiments are those that include a sensor in communication with the haptic element for sensing mechanical work carried out on the haptic element by a person in the vehicle. Among these are embodiments in which the sensor is a pressure sensor or a piezoelectric sensor in communication with the haptic element. Such a sensor senses mechanical work carried out on the haptic element by a person in the vehicle. Also, among these are embodiments in which a sensor for sensing mechanical work carried out on the haptic element by a person in the vehicle, wherein the sensor is integrated into the fabric.

In some embodiments, the frame comprises a frame of a vehicle's seat.

Also, among the embodiments are those that include a sensor for sensing mechanical work carried out on the haptic element by a person in the vehicle. In such embodiments, the sensor is on a frame of a vehicle's seat and performing mechanical work on the fabric causes the sensor to sense the work and to provide a signal that causes the vehicle to be steered in a particular direction that corresponds to the work. The haptic-communication system thus effectively implements a functional equivalent of a steering wheel.

Also, among the embodiments are those in which the frame comprises a frame of a vehicle's steering interface.

Embodiments further include a sensor for sensing mechanical work carried out on the haptic element by a person in the vehicle. Such a sensor outputs a signal that controls a user interface of a vehicle. The user interface could be one of several in the vehicle, such as the user interface of an entertainment system or that of a climate-control system.

Still other embodiments include an operating system connected to the haptic-communication system. In response to a signal from the operating system, the haptic-communication system delivers haptic feedback indicative of a condition that has been classified by either the haptic-communication system or the operating system as being a dangerous condition.

Embodiments further include this that includes a sensor for sensing mechanical work carried out on the haptic element by a person in the vehicle. In such embodiments, the frame comprises a frame of a steering interface of a vehicle operating in a first driving mode and the sensor is disposed on this frame. The sensor senses work performed on the fabric and, in response, provides a signal that causes the vehicle to cease operating in the first driving mode and to commence operation in a second driving mode. As an example, the signal may cause the vehicle to transition from driving at a first average speed to driving at a second average speed.

Embodiments further include those in which the fabric comprises an interactive textile or a haptic textile. Among these are embodiments in which the textile has first and second layers of which the first layer is a haptic layer. In such embodiments, actuation of the haptic elements reveals or conceals an underlying pattern or color in the second layer.

Embodiments further include those in which the apparatus includes a vehicle and the haptic-communication system is a constituent of the vehicle. Among these are autonomous or self-driving vehicles.

Also, among the embodiments are that that include an actuator and a controller that causes the actuator to change a state of the haptic element. Among these are those in which the controller causes the haptic element's state to change in response to a signal from a sensor.

Other features and advantages of the invention are apparent from the following description, and from the claims.

DESCRIPTION

Figure 1:
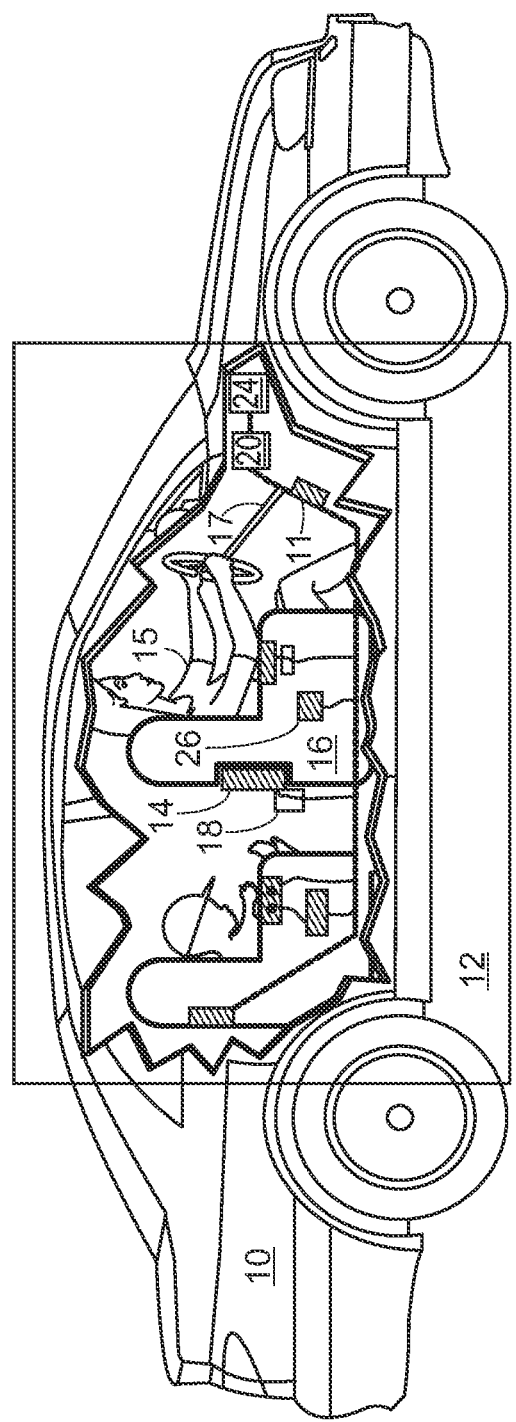
FIG. 1 shows a haptic-communication system.

FIG. 1 shows a vehicle 10 having a user interface 11 and a haptic-communication system 12. Vehicles 10 that are not completely autonomous may also include a steering interface 17. Examples of a steering interface include a steering wheel, a steering till, and a portion of the seat 16.

Figure 2:
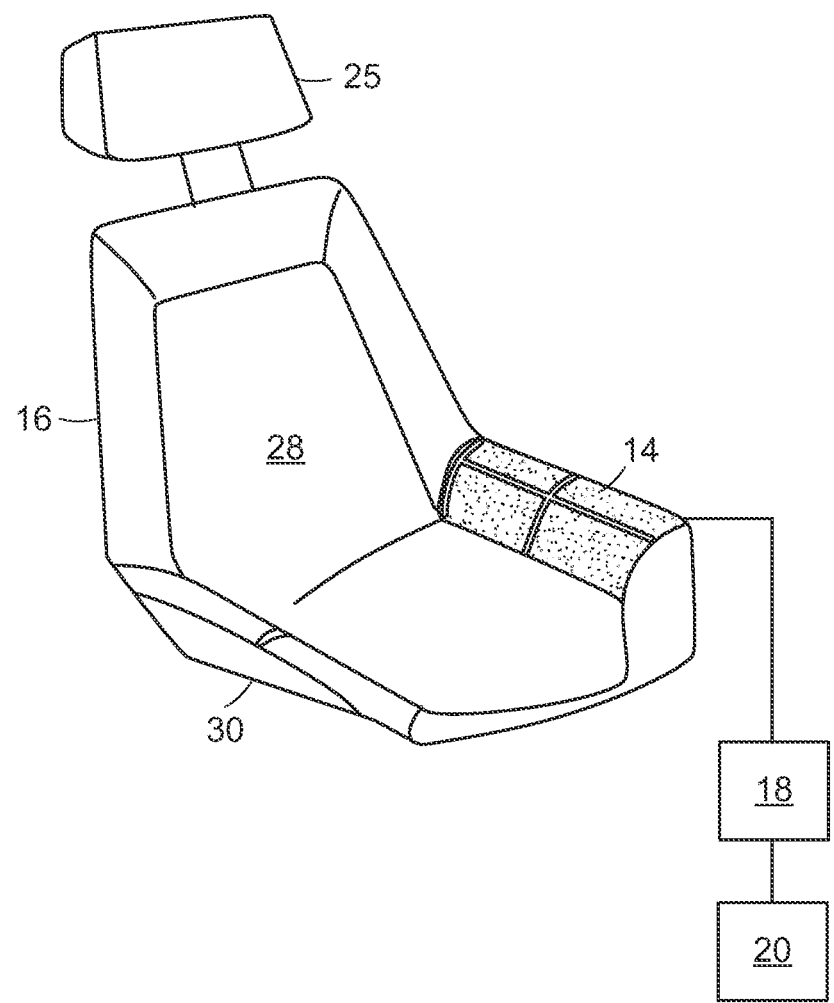
FIG. 2 shows a seat from the haptic-communication system of FIG. 1.

The haptic-communication system 12 includes one or more haptic elements 14 for communication with one or more of the vehicle's occupants 15. Each haptic element 14 is an integral part of a vehicle seat 16, as shown in FIG. 2. A particular vehicle seat 16 includes one or more haptic elements 14.

Each haptic element 14 connects to a corresponding actuator 18. A controller 20 connected to the actuators 18 provides communication between one or more haptic elements 14 and one or more operating systems 24 in the vehicle 10.

In the context of the specification, the term "operating system" is not intended to mean the software that manages the operation of other software on a computer. As used herein, the "operating system" is one of the systems that is responsible for a particular aspect of vehicle operation. Its use is therefore analogous to the use of such terms as "nervous system" and "respiratory system" in the context of anatomy.

In some cases, the controller 20 responds to an instruction by an operating system 24 to actuate a haptic element 14 in an effort to signal an occupant 15. This is an example of a haptic communication from the operating system 24 to the occupant 15.

In other cases, the occupant 15 signals an operating system 24 by applying a force on the haptic element 14. In such cases, the controller 20 senses the application of this force and relays an appropriate signal to the relevant operating system 24. This provides haptic communication from the occupant 15 to the operating system 24.

Embodiments include those in which the haptic-communication system 12 provides haptic communication both from the occupant 15 to the operating system 24 and from the operating system 24 to the occupant 15. Other embodiments include those in which the haptic-communication system 12 only provides haptic communication from the operating system 24 to the occupant 15. Yet other embodiments include those in which the haptic-communication system 12 only provides haptic communication from the occupant 15 to the operating system 24.

In some cases, the haptic-communication system 12 includes a mechanism for enabling the occupant 15 to enable or disable its operation as desired.

In some embodiments, the haptic element 14 is a pneumatic element and the actuator 18 is a pump. In other embodiments, the haptic element 14 is a piezoelectric element and the actuator 18 applies a voltage to change the state of the piezoelectric element in a way that can be sensed by an occupant 15. A particularly useful embodiment is one in which the haptic element 14 is incorporated into a textile material with which the vehicle seat is covered 16. Such a material is often referred to as an "interactive textile" or a "haptic textile."

Figure 3:
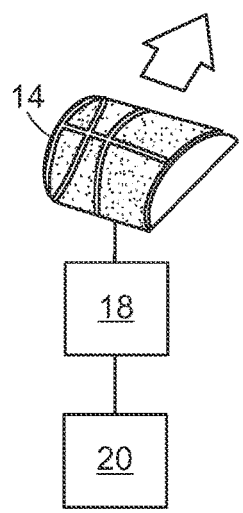
FIG. 3 shows an actuated haptic-element from the seat shown in FIG. 2.

To send a message to the seat's occupant 15, the controller 20 actuates the appropriate actuator 16. In response, the actuator 16 causes a perceptible change to its corresponding haptic element 14, as shown in FIG. 3. A change may manifest itself in a noticeable change of the haptic element's size, such as an enlargement or diminution of its volume. Alternatively, a change may be in the form of a vibration at some amplitude and frequency chosen to be perceptible to the occupant 15.

In some embodiments, the occupant 15 adjusts the amplitude and frequency. For example, bulky clothing is apt to interfere with receiving a haptic signal. Thus, an occupant 15 may set the haptic-communication system 12 so that all haptic signals intended for the occupant 15 are made more conspicuous, for example by causing them to have a larger amplitude.

The seat's occupant 15 detects this change in the haptic element 14. Having read the instructions that come with the vehicle 10 and learned the messages associated with various haptic stimuli, the seat's occupant 15 will recognize this as a haptic message that has been relayed by controller 20 from one of the operating systems 24. Having done so, the seat's occupant 15 will proceed to decode it. As a result, the haptic-communication system 12 sends a message to the seat's occupant 15 in a subtle and unobtrusive manner.

For example, in some embodiments, the operating system 24 is a panoramic machine-vision system capable of detecting potential hazards on either side of the vehicle 10. In such an embodiment, the controller 20 receives a signal from the operating system 24 and uses that signal to determine which of several haptic elements 14 on a seat 16 should be made to change state.

As an example, if the machine-vision system detects a car passing on the vehicle's left side, the controller 20 causes a haptic element 14 on the seat's left side to change state. This would nudge the seat's occupant 15 to look to the left.

In the case of a self-driving vehicle 10, the erstwhile driver may have fallen asleep on the way to the destination. In such embodiments, the controller 20 actuates a haptic element 14 on a headrest 25 to gently awaken the driver.

The change in state is either an enlargement or diminution in the haptic element's volume or a change in its form. To provide a more prominent signal, the haptic-communication system 12 causes a time-varying change. In some cases, the frequency of such variation may change during the communication. As an example, the haptic-communication system 12 may convey a sense of urgency by gradually increasing the frequency of a vibration.

Figure 4:
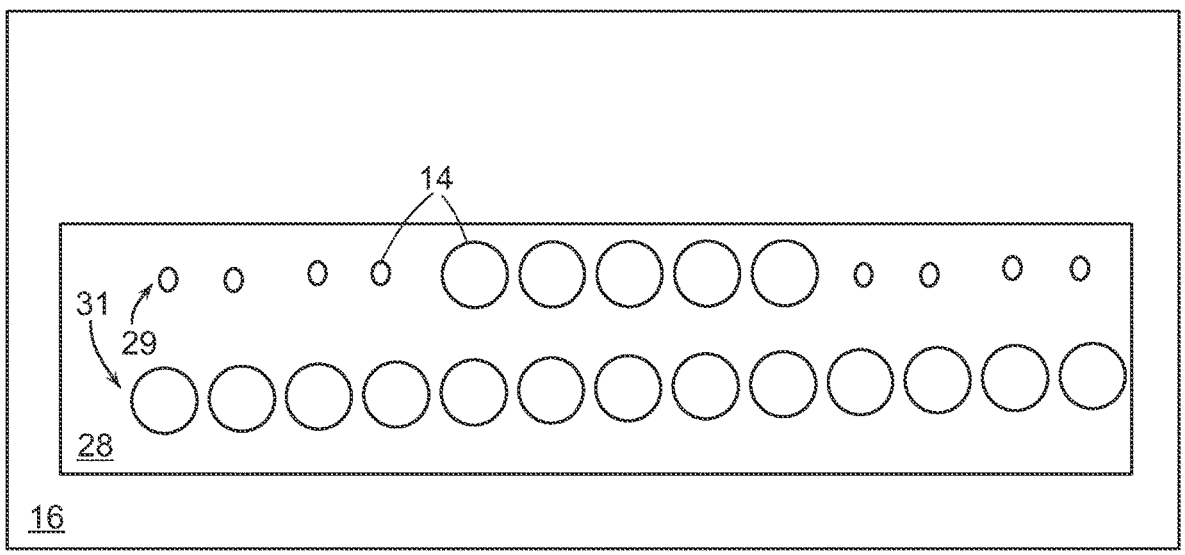
FIG. 4 shows a portion of the seat shown in FIG. 2 in which the haptic elements are in a haptic layer of a two-layer fabric.

Referring now to FIG. 4, in some embodiments, the fabric 28 includes a haptic layer 29 and a base layer 31. The haptic layer 29 includes the haptic elements 14. By selectively actuating haptic elements 14 as shown in FIG. 4, it becomes possible to selectively expose different portions of the base layer 31.

Such a feature is useful, for example, when evacuating a bus or airplane. In such cases, the base layer 31 is a conspicuous color and the haptic elements 14 are selectively actuated to reveal an arrow of that color pointing to the nearest emergency exit. In some embodiments, the actuators 18 are further programmed to actuate haptic elements 14 at different times so as to form an animated arrow to assist further in guiding passengers as they evacuate.

Figure 5:
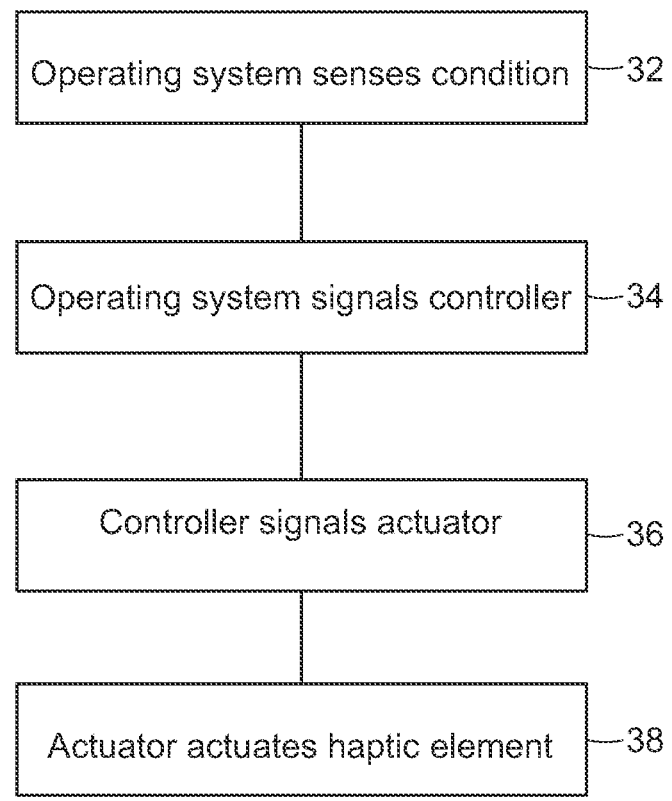
FIG. 5 shows a process carried out by the haptic-communication system of FIG. 1 for communication from the vehicle to an occupant of the vehicle.

FIG. 5 shows a flow-chart of the haptic-communication system 12 causing a haptic message to be sent from an operating system 24 to an occupant 15.

The process begins with the operating system 24 sending a particular condition that an occupant 15 should be made aware of (step 32). Such conditions run the gamut from detecting an obstacle in one of the vehicle's blind spots, detecting a tire that requires inflation, drawing attention to an imminent exhaustion of fuel, a failure of coolant operation, presence of electromagnetic radiation indicative of nearby law-enforcement activity, and any of the conditions that could be communicated with conventional warning lights on an ordinary vehicle's dashboard.

Upon detecting such a condition, the operating system 24 signals the controller 20 to initiate a communication sequence that is expected to end in the occupant's awareness of the relevant condition (step 34). The controller 20 receives the signal from the operating system 24, identifies a relevant actuator 18, and then causes that actuator 18 to actuate the appropriate haptic element 14 (step 36). The actuator 18 then actuates the relevant haptic element 14, thereby initiating an attempt to draw the occupant's attention to the existence of the condition (step 38).

The foregoing description explains transmission of a message from the operating system 24 to the seat's occupant 15. However, it is also possible for the occupant 15 to send a message to the operating system 24.

To accommodate such communication, the haptic-communication system 12 features work sensors 26. A work sensor 26 senses the consequences of mechanical work carried out by the seat's occupant 15 on a haptic element 14. Such mechanical work includes the exertion of a force over a distance or the exertion of a torque over an angle. In some embodiments, the work sensor 26 comprises an amplifier or pre-amplifier having an input coupled to the haptic element 14 and an output coupled to the controller 20.

Figure 6:
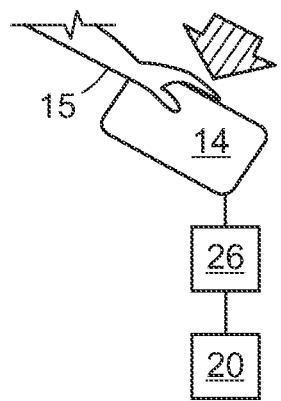
FIG. 6 shows the occupant performing mechanical work on a haptic element such as that shown in FIG. 3.

FIG. 6 shows a portion of the seat's occupant 15 in the midst of performing such mechanical work on a haptic element 14. The illustrated portion of the seat's occupant 15 is applying a force whose magnitude and direction are indicated by the force vector shown in the figure. This results in a deformation of the haptic element 14, a volume integral of which provides a measure of the extent of the mechanical work. In a preferred embodiment, the work sensor 26 measures the magnitude of the mechanical work.

In the case of a pneumatically-actuated haptic element 14, a useful work sensor 26 is a pressure sensor that senses a pressure change caused by an occupant 15 squeezing or otherwise deforming a haptic element 14 that borders a gas-filled space. Another useful work sensor 26 in such cases is a temperature sensor that senses the increase in temperature that results from reducing the volume available for the pneumatic working medium. In other embodiments, the sensor 26 is a voltage sensor. This is useful in the case in which haptic element 14 is an interactive textile, such as a textile that incorporates piezoelectric materials that generate a voltage in response to mechanical work.

As a result of the work sensor 26, it is possible for the occupant 15 to provide a haptic message to the controller 20. The controller 20 then relays the relevant information in that message to the operating system 24 for appropriate action.

In some cases, the communication to the controller 20 represents a command. Among these are embodiments in which the occupant 15 actuates a haptic element 14 at different locations, or alternatively, a pair of haptic elements 14 at different locations, to steer the car in a particular direction. The work sensor 26 senses the extent of the mechanical work resulting from the squeezing and provides that to the controller 20, which then relays it to the vehicle's steering system. The extent of that mechanical work provides a measure of the desired extent of a course correction and the particular haptic element 14 actuated provides information indicative of the direction of that correction. This embodiment is particularly useful for certain autonomous vehicles 10 that accept steering commands of human origin in only rare cases. Such vehicles 10 may lack a conventional steering interface 17.

In other cases, the autonomous vehicle 10 is taking care of steering. As a result, those same haptic elements 14 become available for another purpose. For example, they can be used as video game actuators for the occupant's entertainment. Or, they can be used to control a user interface 11, for example, to control an entertainment system. In such cases, the occupant 15 actuates the haptic elements 14 to carry out such actions as scrolling through a list of content on such an entertainment system and selecting an element from that list.

In other embodiments, the haptic-communication system 12 implements a form of cruise control for the autonomous vehicle 10. For example, if the occupant 15 regards the autonomous vehicle 10 as driving at an uncomfortably fast pace, the occupant 15 may squeeze a particular haptic element 14. Conversely, if the occupant 15 regards the autonomous vehicle 10 as driving too slowly, the occupant 15 may squeeze another haptic element 14.

In some of the foregoing embodiments, the haptic-communication system 12 interprets extent of actuation or rate of actuation as indicative of the occupant's emotional state. In some of these embodiments, the controller 20 receives a time-varying signal representative of the occupant's actuation and relies on the amplitude and first and second derivatives of that signal as a basis for estimating the occupant's emotional state.

Figure 7:
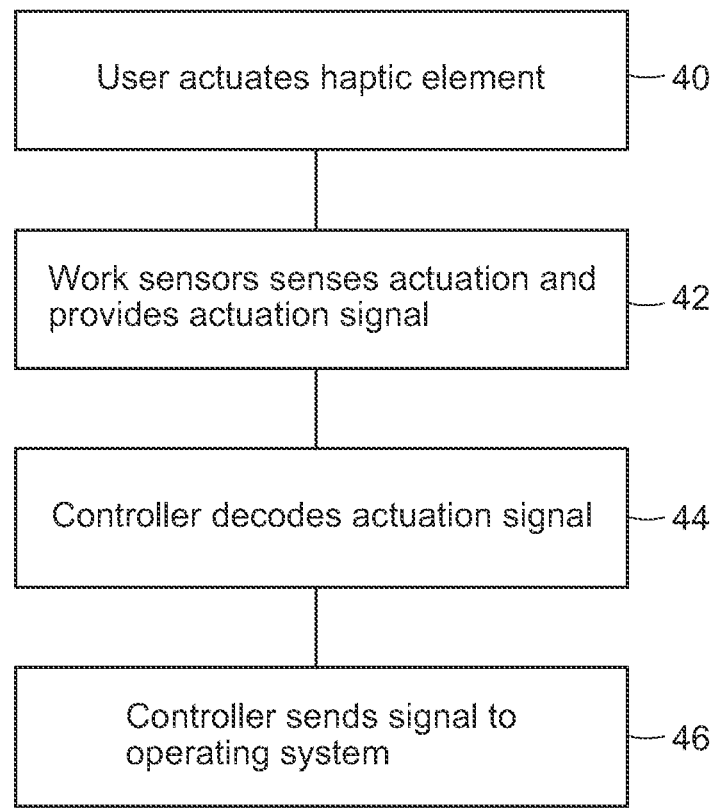
FIG. 7 shows a process carried out by the haptic-communication system of FIG. 1 for communication from the occupant to the vehicle.

FIG. 7 shows procedural steps associated with haptic communication from the occupant 15 to the operating system 24. The process begins with the occupant 15 actuating a particular haptic element 14 (step 40). A work sensor senses the occupant's actuation of the haptic element 14 and provides an actuation signal to the controller 20 (step 42). Since there are potentially many haptic elements 14 that can be actuated in different ways, the controller 20 must identify what the occupant 15 is attempting to communicate so that the appropriate operating system 24 can be identified. To do so, the controller 20 decodes the actuation signal (step 44). After having identified the correct operating system 24 for receiving the occupant's message, the controller 24 sends a relevant signal to that operating system 24 (step 46).

Figure 8:
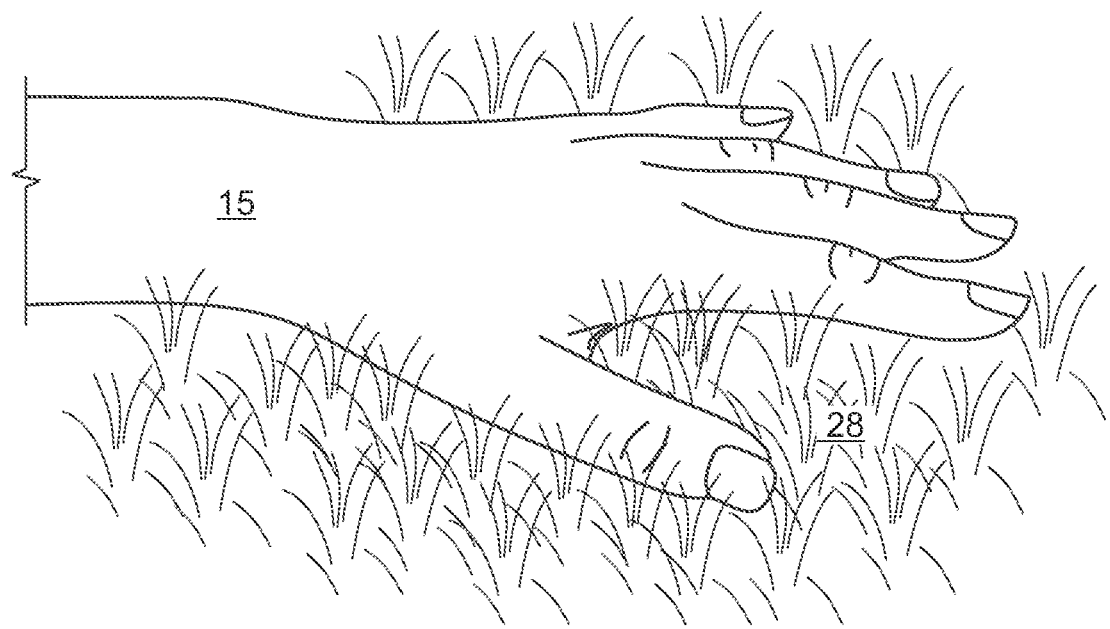
FIG. 8 shows an occupant's hand pressing on an interactive fabric from which a haptic element such as that shown in FIG. 3 is made.

In the foregoing cases, it is useful for the work sensor 26 to be made integral with the haptic element 14 itself. This can be achieved by having the surface of the haptic element 14 comprise a fabric 28 that is formed with integral work sensors 26. Such a fabric is made from a textile that is often called an "interactive textile" or "smart textile." FIG. 8 shows a portion of the occupant 15 resting on such a fabric 28.

Figure 9:
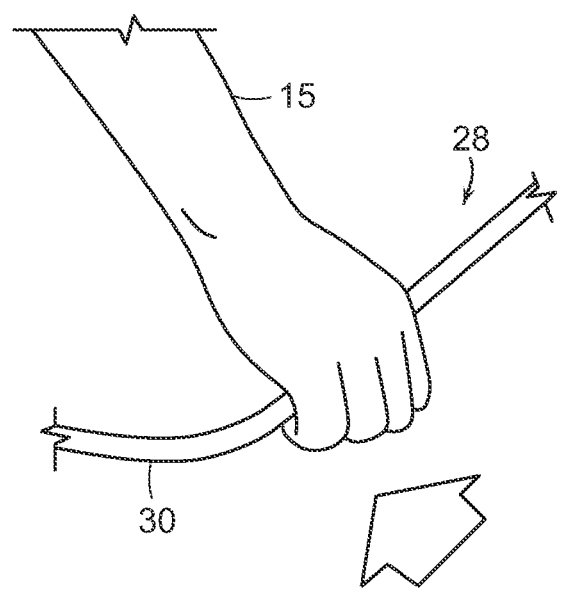
FIG. 9 shows an occupant's hand squeezing a frame that supports an interactive fabric shown in FIG. 7.

In some embodiments, as shown in FIG. 9, a frame 30 supports the fabric 28. The frame 30 is part of an existing structure on the vehicle 10, such as a seat 16 or a steering interface 17. Thus, the occupant 15 causes mechanical work to be carried out on the fabric 28 by squeezing the frame 30. that is suspended on a frame 30. In some embodiments, the squeezing the frame 30 causes steering commands to be transmitted to the controller 20. As a result, the frame 30 of the seat 16 is an embodiment of a steering interface 17.

It is to be understood that the foregoing description is intended to illustrate and not to limit the scope of the invention, which is defined by the scope of the appended claims. Other embodiments are within the scope of the following claims.

What is claimed is:

1. An apparatus comprising a haptic-communication system, said haptic-communication system comprising a haptic element, a fabric that comprises a textile that is integral with said haptic element, and a frame that supports said fabric, wherein a transition of said haptic element between first and second states thereof provides communication between a vehicle and a person who is in contact with said haptic element, wherein said haptic communication system provides communication between said person and said vehicle, and wherein said communication comprises communication from said person to said vehicle.

2. The apparatus of claim 1, wherein said frame comprises a frame of said vehicle's steering interface and wherein said haptic communication system enables said person to steer said vehicle through said haptic interface.

3. The apparatus of claim 1, wherein said fabric comprises a haptic textile.

4. The apparatus of claim 1, further comprising an actuators, a sensor, and a controller, wherein said controller causes said actuator to change a state of said haptic element in response to a signal from said sensor.

5. The apparatus of claim 1, wherein said fabric comprises a haptic layer and a base layer, wherein said haptic element is one of a plurality of haptic elements in said haptic layer, and wherein selective actuation of said haptic elements exposes different portions of said base layer.

6. The apparatus of claim 1, wherein said vehicle is selected from the group consisting of a bus and an airplane, and wherein actuation of said haptic-communication system provides passengers of said vehicle with an animated visual guide for guiding passengers during evacuation of said vehicle.

7. The apparatus of claim 1, wherein actuation of said haptic-communication system provides passengers of said vehicle with a visual guide for use in evacuating said vehicle.

8. The apparatus of claim 1, wherein said haptic element is integral with a steering interface and wherein said steering interface includes a portion of a seat.

9. The apparatus of claim 1, wherein said haptic element comprises a piezoelectric element that is incorporated into the textile material, wherein the textile material covers a vehicle seat of said vehicle.

10. An apparatus comprising a haptic-communication system, said haptic-communication system comprising a frame, a fabric, and a haptic element, wherein said frame supports said fabric, wherein said fabric comprises a textile that is integral with said haptic element, and wherein a transition of said haptic element between first and second states thereof provides communication from a person to a vehicle, said person being in contact with said haptic element, said apparatus further comprising a sensor in communication with the haptic element for sensing mechanical work carried out on said haptic element by said person in said vehicle.

11. The apparatus of claim 10, wherein said sensor that is in communication with said haptic element and that senses said mechanical work carried out on said haptic element comprises a piezoelectric sensor that senses an extent of said mechanical work.

12. The apparatus of claim 10, wherein said sensor is integrated into said fabric.

13. The apparatus of claim 10, wherein said sensor, which is in communication with said haptic element and which senses said mechanical work carried out on said haptic element, also outputs a signal that controls a user interface of a vehicle.

14. An apparatus comprising a haptic-communication system, said haptic-communication system comprising a frame, a fabric, and a haptic element, wherein said frame supports said fabric, wherein said fabric comprises a textile that is integral with said haptic element, and wherein a transition of said haptic element between first and second states thereof provides communication with a person in contact with said haptic element, said apparatus further comprising a sensor for sensing mechanical work carried out on said haptic element by a person in a vehicle, wherein said sensor is on a frame of the vehicle's seat and performing mechanical work on said fabric causes said sensor to sense said work and to provide a signal that causes said vehicle to be steered in a particular direction that corresponds to said work.

15. The apparatus of claim 14, further comprising an actuator and a controller, wherein said controller causes said actuator to change a state of said haptic element.

16. An apparatus comprising a haptic-communication system, said haptic-communication system comprising a frame, a fabric, and a haptic element, wherein said frame supports said fabric, wherein said fabric comprises a textile that is integral with said haptic element, and wherein a transition of said haptic element between first and second states thereof provides communication with a person in contact with said haptic element, said apparatus further comprising a sensor for sensing mechanical work carried out on said haptic element by a person in a vehicle, wherein said frame comprises a frame of a steering interface of the vehicle operating in a first driving mode, wherein said sensor is disposed on said frame, and wherein said sensor senses work performed on said fabric and, in response, provides a signal that causes said vehicle to cease operating in said first driving mode and to commence operation in a second driving mode.

17. The apparatus of claim 16, wherein said first driving mode is a non-autonomous driving mode and said second driving mode is an autonomous driving mode.

\* \* \* \* \*